United States Patent
Pena et al.

(10) Patent No.: US 9,594,548 B2
(45) Date of Patent: Mar. 14, 2017

(54) DYNAMICALLY UPDATING TEMPLATED APPLICATIONS

(75) Inventors: Ronny A. Pena, Lowell, MA (US); Ajamu A. Wesley, Concord, MA (US)

(73) Assignee: International Business Machines Corporation, Armonk, NY (US)

(*) Notice: Subject to any disclaimer, the term of this patent is extended or adjusted under 35 U.S.C. 154(b) by 2443 days.

(21) Appl. No.: 11/318,802

(22) Filed: Dec. 27, 2005

(65) Prior Publication Data
US 2007/0150882 A1   Jun. 28, 2007

(51) Int. Cl.
*G06F 9/44* (2006.01)
*G06F 9/445* (2006.01)

(52) U.S. Cl.
CPC ..................... *G06F 8/65* (2013.01)

(58) Field of Classification Search
USPC .................................................. 717/168–178
See application file for complete search history.

(56) References Cited

U.S. PATENT DOCUMENTS

| | | | |
|---|---|---|---|
| 6,182,279 B1* | 1/2001 | Buxton | 717/100 |
| 6,912,710 B2* | 6/2005 | Broussard et al. | 717/170 |
| 7,512,942 B2* | 3/2009 | Brown et al. | 717/174 |
| 7,559,059 B2* | 7/2009 | Renaud | 717/174 |
| 7,584,467 B2* | 9/2009 | Wickham et al. | 717/171 |
| 7,673,028 B2* | 3/2010 | Baikov et al. | 709/223 |
| 2005/0085937 A1* | 4/2005 | Goodwin et al. | 700/107 |
| 2005/0144610 A1* | 6/2005 | Zenz | G06F 9/5011 717/168 |
| 2005/0262499 A1* | 11/2005 | Read | G06F 8/67 717/172 |
| 2006/0245354 A1* | 11/2006 | Gao et al. | 370/230 |

OTHER PUBLICATIONS

Budinsky et al., "Eclipse Modeling Framework: A Developer's Guide", Pearson Education, 2003, ISBN 0131425420.*

* cited by examiner

*Primary Examiner* — Ryan Coyer
(74) *Attorney, Agent, or Firm* — Steven M. Greenberg, Esq.; CRGO Law

(57) ABSTRACT

Embodiments of the present invention address deficiencies of the art in respect to templated application deployment, and provide a novel and non-obvious method, system and computer program product for dynamically updating templated applications. In one embodiment of the invention, a templated application deployment data processing system can include an application container configured to host templated application instances defined by one or more templates. The system also can include application deployment logic including program code enabled to deploy the templated application instances into the application container responsive to the templates. Finally, the system can include a listener architecture coupled to the application deployment logic and configured to notify the application deployment logic of changes to the templates for the application instances.

12 Claims, 3 Drawing Sheets

DYNAMICALLY UPDATING TEMPLATED APPLICATIONS

BACKGROUND OF THE INVENTION

Field of the Invention

The present invention relates to dynamically updating application components and more particularly to dynamically updating templated applications.

Description of the Related Art

Computer software applications justify the globally ravenous appetite for expensive computing technology. As the utility of computer software becomes more apparent to the least technically inclined, computing technology becomes more of a natural element of life without which productivity seemingly would grind to a halt much as would be the case without the benefit of telecommunications. Along with enhanced productivity associated with computer software, so too has the demand for more end-user specific applications increased. In this regard, no longer will it suffice that a single embodiment of a computer program solves a general problem. Rather, end-users have come to expect more particular configurations for computer software to address unpredictable end-user problem spaces.

The distribution of enterprise-wide computing applications has rested largely upon the shoulders of distributable computing components which once retrieved from a network code base can execute within the virtual environment of the conventional content browsing client. More particularly, applications can be formed through the unique arrangement of discrete application components which can be distributed on demand to client computing devices scattered about the enterprise. To support the on demand distribution of the discrete application components, application servers have formed the backbone of the distributed application and function to manage the arrangement and distribution of application components to form a highly customized enterprise application.

Despite the flexibility of the modern application server, however, the end user configuration of an enterprise application through the combination of discrete application components can involve a requisite level of computing expertise not prevalent throughout each enterprise. Consequently, the customization of an enterprise application can involve the expenditure of vast sums in order to support the development and maintenance of a customized enterprise computing application. The expenditure of vast sums to support the development and maintenance of a customized enterprise computing application, however, represents a substantial departure from the notion of ages gone by that an application can be customized by an unsophisticated end user through the generation of a document template as had been the case in the venerable spreadsheet.

Templated application technology provides for the customization of an enterprise application without requiring an end user level of expertise of a software developer. Rather, as described in United States Patent Application Publication No. US 2005 0085937 A1 by James Goodwin of Beverly, Mass. United States entitled CREATING CUSTOMIZED APPLICATIONS USING TEMPLATES HAVING POINTS OF VARIABILITY, in a templated application, a markup language specified document can specify the assembly of different application component. The markup language specified document, in turn, can be processed into application logic for the enterprise application. In this way, an end user need only edit a markup language document in order to produce a highly customized end user application. Commercial embodiments of development tools enabled for templated application development include the Lotus™ Workplace Builder™ product manufactured by International Business Machines Corporation of Armonk, N.Y., United States.

The end user application development model enabled by Workplace Builder is predicated on the assembly and customization of extensible markup language (XML) based application templates. In this regard, the XML specified application templates of Workplace Builder can define an application and all corresponding subcomponents. Each XML specified application template further can include points of variability which can be configured by end users when creating an application instance from the XML specified template. Notwithstanding, end user applied changes to the application templates are not easily reflected in the resulting application instance which can result in a disconnect between the application specified by the end user in the application templates and the resulting application instance.

BRIEF SUMMARY OF THE INVENTION

Embodiments of the present invention address deficiencies of the art in respect to templated application deployment, and provide a novel and non-obvious method, system and computer program product for dynamically updating templated applications. In one embodiment of the invention, a templated application deployment data processing system can include an application container configured to host templated application instances defined by one or more templates. The system also can include application deployment logic including program code enabled to deploy the templated application instances into the application container responsive to the templates. Finally, the system can include a listener architecture coupled to the application deployment logic and configured to notify the application deployment logic of changes to the templates for the application instances.

In one aspect of the invention, the listener architecture can include an Application Instance class implementing an Eclipse™ Modeling Framework (EMF) EObject and an EMF Adapter. (Eclipse is a trademark of the Eclipse Foundation of the Internet domain eclipse.org). Likewise, a Template Model class also can implement the EMF EObject and EMF Adapter. Finally, a Registry class can be provided which associates different instances of the Template Model with different instances of the Application Instance. In another aspect of the invention, an Application Instance Proxy class can be disposed between the Template Model class and the Application Instance class. Finally, in yet another aspect of the invention, a development environment can be coupled to the application deployment logic and configured to modify the templates.

In another embodiment of the invention, a method for deploying modified application instances for modified templates in a templated application deployment environment can be provided. The method can include deploying a set of application components specified by at least one corresponding application template. The method further can include listening for changes in the corresponding application template. Finally, the method can include re-deploying a modified form of affected ones of the application components to reflect the detected change in the corresponding application template in response to detecting a change in the at least one corresponding application template.

In one aspect of the embodiment, deploying a set of application components specified by at least one corresponding application template can include parsing the corresponding application template to identify the application components, in addition to sub-components and points of variability. Consequently, instances of the application components and sub-components can be created according to the points of variability. In another aspect of the embodiment, listening for changes in the at least one corresponding application template can include subscribing to a listener architecture to receive notifications of changes in the at least one corresponding application template. In yet another aspect of the embodiment, re-deploying a modified form of affected ones of the application components to reflect the detected change in the corresponding application template can include requesting a proxy for affected ones of the application components to re-deploy a modified form of the affected ones of the application components to reflect the detected change in the corresponding application template.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamically updating templated applications. In accordance with an embodiment of the present invention, a template modifications for an application template can be detected and compared to one or more corresponding application instances reliant upon the application template. For instance, a listener architecture can be established for the application templates to detect modifications in the application templates. Responsive to detecting a template modification, the application instances can be re-instantiated in an updated form reflecting the template modifications for the application template.

Figure 1:
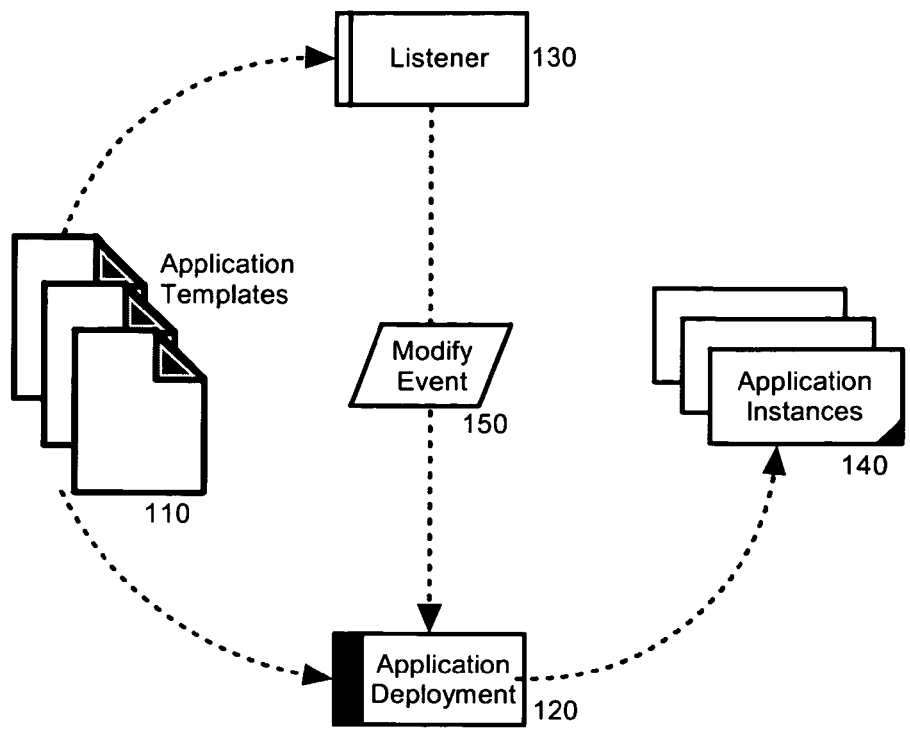
FIG. 1 is a pictorial illustration of a templated application deployment environment configured for dynamically updating templated applications.

In further illustration, FIG. 1 is a pictorial illustration of a templated application deployment environment configured for dynamically updating templated applications. As shown in FIG. 1, a set of application templates 110 can define corresponding application instances 140 produced by application deployment logic 120. The application deployment logic 120 can read each of the templates 110 to identify application components and sub-components in addition to points of variability defined with the templates 110. Subsequently, the application deployment logic 120 can locate and instantiate application instances corresponding to the identified application components, sub-components and points of variability as it is well-known in the art.

Importantly, a listener architecture 130 can be linked to both the application templates 110 and the application deployment logic 120. The listener architecture 130 can detect changes in the application templates 110. Responsive to detecting changes in the application templates 110, the listener architecture 130 can provide a notification 150 to the application deployment logic 120. As such, the application deployment logic can identify affected ones of the application instances 140. Subsequently, the application deployment 120 can undertake action to replace the affected ones of the application instances with modified forms of the affected ones of the application instances. In this regard, the replacement can occur automatically, or the end user can be prompted to authorize or defer or deny the replacement, for example.

Figure 2:
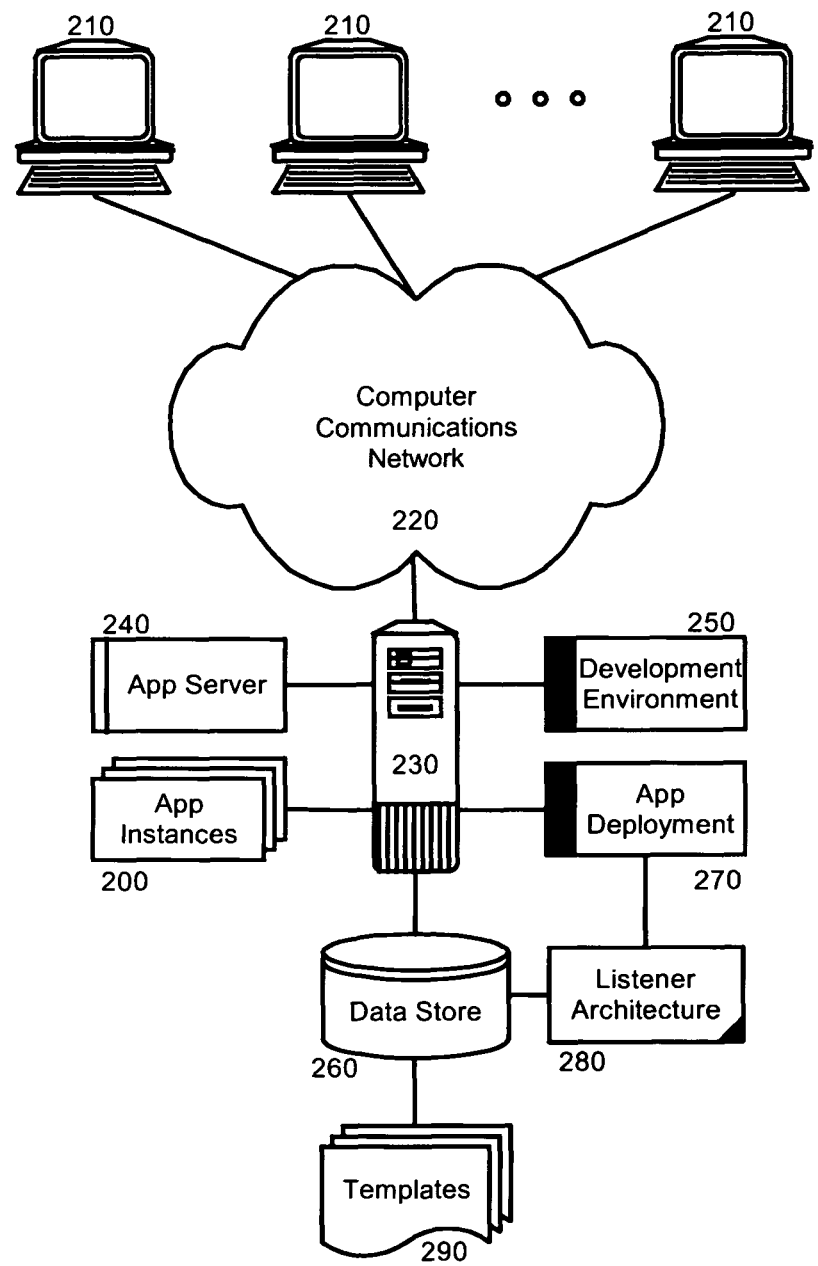
FIG. 2 is a schematic illustration of a data processing system configured for dynamically updating templated applications.

Turning now to FIG. 2, a schematic illustration is shown of a data processing system configured for dynamically updating templated applications. The data processing system can include one or more client computing devices 210 communicatively coupled to a server computing device 230 over a computer communications network 220. The server computing device 230 can include an application server 240 or other comparable container for hosting the execution of application instances 200 for access by the client computing devices 210 over the computer communications network 220. Optionally, the server computing device 230 further can host a development environment 250 with which applications can be specified according to templates 290 persisted in a data store 260. In other, equally preferred embodiments, however, the development environment 250 can be disposed within a different computing device.

Notably, templates 290 specifying an application can be processed by application deployment logic 270 to produce the application instances 200 forming a templated application. Deploying application instances 200 from one or more templates 290 to generate a templated application is a process which is well-known in the art and described amply by United States Patent Application Publication No. US 2005 0085937 A1 by James Goodwin of Beverly, Mass., United States entitled CREATING CUSTOMIZED APPLICATIONS USING TEMPLATES HAVING POINTS OF VARIABILITY.

Importantly, a listener architecture 280 can be provided for the templates 290. The listener architecture 280 can be configured to detect changes to the templates 290. Responsive to detecting changes in one or more of the templates 290, the application deployment logic 270 can be notified to locate affected ones of the application instances 200. Once located, the affected ones of the application instances 200 can be selectively replaced for updated versions reflecting the changes in the templates 290. Consequently, end user modifications to the templated application can be dynamically applied without requiring knowledge of application administration and deployment on the part of the end user.

The templated application deployment environment provided by the data processing system of FIG. 2 can incorporate EMF technology. EMF provides a robust framework for modeling structured data and has become the lingua franca of data exchange and integration across tooling and run-time environments. A number of services are provided natively by EMF including XML serialization of Java objects, and a meta-model known as "ECore" for modeling structured information including attributes, references, operations and the like. Importantly, EMF also provides a notification framework where adapters can be notified of modifications to an underlying "EObject". Consequently, in the present invention, both the templates 209 and the application instances 200 can implement an EMF EObject in order to enable the listener architecture 280.

Figure 3:
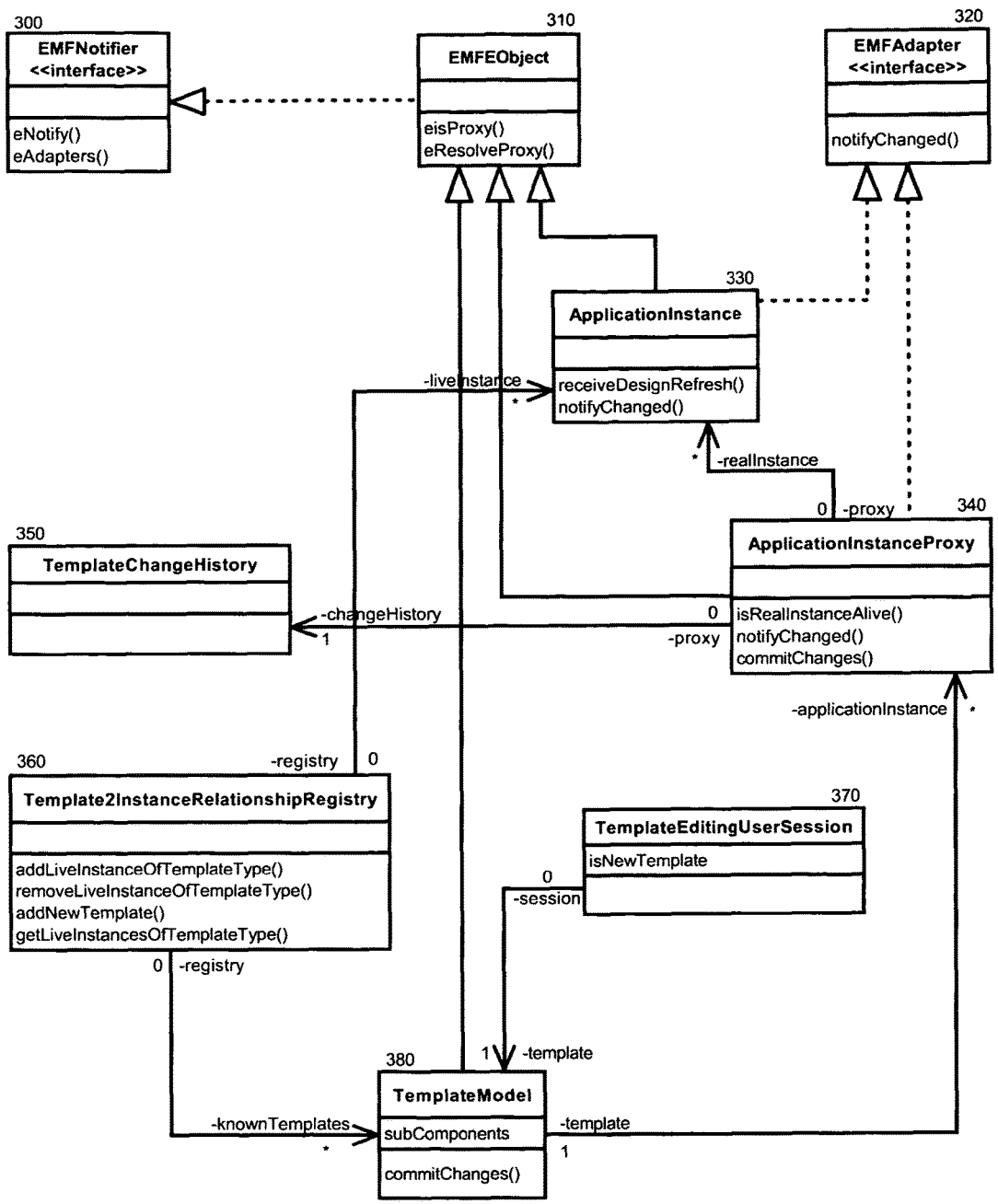
FIG. 3 is a class diagram of a templated application deployment environment configured for dynamically updating templated applications; and, FIG. 4 is a flow chart for dynamically updating templated applications.

In more particular illustration, FIG. 3 is a class diagram of a templated application deployment environment configured for dynamically updating templated applications. As shown in FIG. 3, the templated application deployment environment can include an instance of a Template2InstanceRelationshipRegistry 360 which can be an in-memory registry of application instances in use by an end user. In an instance of a Template2InstanceRelationshipRegistry 360, application instances are categorized by a name of a corresponding template name. Notably, an instance of a Template2InstanceRelationshipReigstry 360 can create one or more template instances of a TemplateModel 380. Each template instance of the TemplateModel 380 can create an instance of an ApplicationInstanceProxy 340.

An ApplicationInstanceProxy 340 can implement an EMFAdapter interface 320 and can sub-class an EMFEObject 310. The EMFEObject 310 in turn can implement an EMFNotifier interface 300. Each instance of an ApplicationInstanceProxy 340 can create one or more corresponding instances of an ApplicationInstance 330 which also can implement an EMFAdapter interface 320 and can sub-class an EMFEObject 310. Additionally, each instance of an ApplicationInstanceProxy 340 can create a single, corresponding instance of a TemplateChangeHistory 350 tracking changes to the instance of the TemplateModel 380 for the instance of the ApplicationInstanceProxy 340. Importantly, each instance of an ApplicationInstanceProxy 340 can adapt to changes in a corresponding instance of a TemplateModel 380 when the template.commitchanges( ) method is called. Also, the changes reflected by the template.commitChanges( ) method can be broadcast to associated instances of the ApplicationInstance 330.

Figure 4:
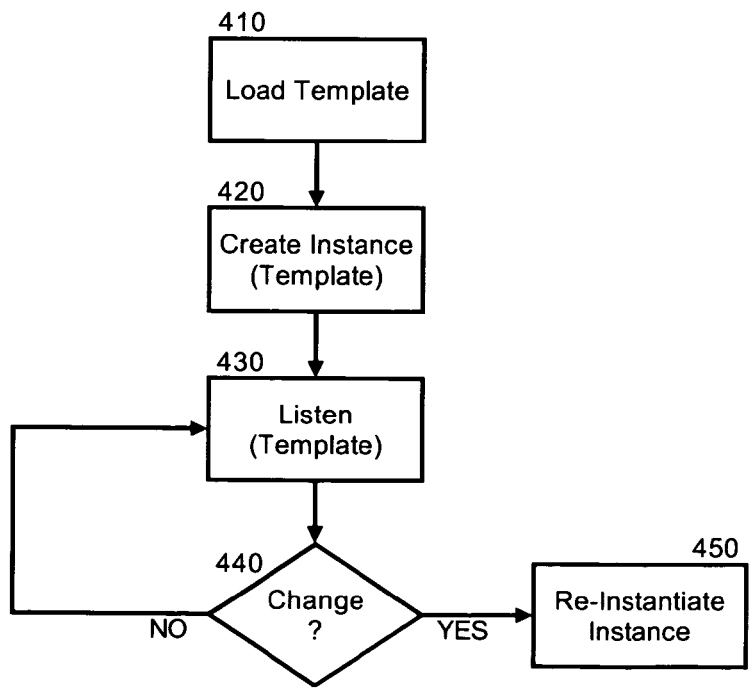

In illustration of the operation of the templated application deployment environment of FIG. 3, a flow chart is shown in FIG. 4 for dynamically updating templated applications. Beginning in block 410, a template can be loaded for processing and in block 420 an application instance can be created for the template. In block 430, a listening process can listen for changes to the template. The listening process can include, for example, subscribing to a notification framework for changes to the template. In decision block 440, if a change is detected in the template, in block 450 an application instance reflecting the changed template can be re-deployed in place of the existing application instance.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A templated application deployment data processing system comprising:
   a server computing device with at least one processor and memory;
   an application container configured to host templated application instances defined by a plurality of templates;
   application deployment logic executing in the server computing device and comprising program code enabled to create the template application instances from the templates and to deploy the templated application instances into the application container; and,
   a listener architecture coupled to the application deployment logic and configured to notify the application deployment logic of changes to the templates for the application instances, and comprising an Application Instance class implementing an Eclipse Modeling Framework (EMF) EObject and an EMF Adapter, a Template Model class also implementing the EMF EObject and EMF Adapter and a Registry associating different instances of the Template Model with different instances of the Application Instance;
   the program code creating new template application instances from the templates that have changed and to deploy into the container the new template application instances in replacement of existing ones of the instances created from the templates prior to the changes.

2. The system of claim 1, wherein the application container is an application server.

3. The system of claim 1, further comprising an Application Instance Proxy class disposed between the Template Model class and the Application Instance class.

4. The system of claim 1, further comprising a development environment coupled to the application deployment logic and configured to modify the templates.

5. A method for deploying modified application instances for modified templates in a templated application deployment environment, the method comprising:
   deploying by application deployment logic executing in memory of a server computing device, a set of application components specified by at least one corresponding application template the application components in the set comprising application instances created from the template and forming a templated application;
   listening for changes in the at least one corresponding application template from which the application instances are created by a listener architecture an Application Instance class implementing an Eclipse Modeling Framework (EMF) EObject and an EMF Adapter, a Template Model class also implementing the EMF EObject and EMF Adapter and a Registry associating different instances of the Template Model with different instances of the Application Instance; and,
   responsive to detecting a change in the at least one corresponding application template, re-deploying a modified form of affected ones of the application components to reflect the detected change in the at least one corresponding application template by creating new instances of the application instances from the changed in the at least one corresponding application template and replacing application instances of the affected ones of the application components with the new instances of the application instances.

6. The method of claim 5, wherein deploying a set of application components specified by at least one corresponding application template, comprises:
   parsing the at least one corresponding application template to identify the application components, in addition to sub-components and points of variability; and,
   creating instances of the application components and sub-components according to the points of variability.

7. The method of claim 5, wherein listening for changes in the at least one corresponding application template, comprises subscribing to a listener architecture to receive notifications of changes in the at least one corresponding application template.

8. The method of claim 5, wherein re-deploying a modified form of affected ones of the application components to reflect the detected change in the at least one corresponding application template, comprises requesting a proxy for affected ones of the application components to re-deploy a modified form of the affected ones of the application components to reflect the detected change in the at least one corresponding application template.

9. A computer program product comprising a non-transitory computer usable storage medium having computer usable program code for deploying modified application instances for modified templates in a templated application deployment environment, said computer program product including:
   computer usable program code for deploying a set of application components specified by at least one corresponding application template the application components in the set comprising application instances created from the template and forming a templated application;
   computer usable program code for listening for changes in the at least one corresponding application template from which the application instances are created by a listener architecture an Application Instance class implementing an Eclipse Modeling Framework (EMF) EObject and an EMF Adapter, a Template Model class also implementing the EMF EObject and EMF Adapter and a Registry associating different instances of the Template Model with different instances of the Application Instance; and,
   computer usable program code for responsive to detecting a change in the at least one corresponding application template, re-deploying a modified form of affected ones of the application components to reflect the detected change in the at least one corresponding application template by creating new instances of the application instances from the changed in the at least one corresponding application template and replacing application instances of the affected ones of the application components with the new instances of the application instances.

10. The computer program product of claim 9, wherein the computer usable program code for deploying a set of application components specified by at least one corresponding application template, comprises:
    computer usable program code for parsing the at least one corresponding application template to identify the application components, in addition to sub-components and points of variability; and,
    computer usable program code for creating instances of the application components and sub-components according to the points of variability.

11. The computer program product of claim 9, wherein the computer usable program code for listening for changes in the at least one corresponding application template, comprises computer usable program code for subscribing to a listener architecture to receive notifications of changes in the at least one corresponding application template.

12. The computer program product of claim 9, wherein the computer usable program code for re-deploying a modified form of affected ones of the application components to reflect the detected change in the at least one corresponding application template, comprises computer usable program code for requesting a proxy for affected ones of the application components to re-deploy a modified form of the affected ones of the application components to reflect the detected change in the at least one corresponding application template.

* * * * *